March 5, 1968  E. H. CARRUTHERS  3,371,689
APPARATUS FOR PACKING FOOD PRODUCTS
Filed June 18, 1965  4 Sheets-Sheet 1

INVENTOR.
EBEN H. CARRUTHERS
BY
Thomsen & Schorr

March 5, 1968 E. H. CARRUTHERS 3,371,689
APPARATUS FOR PACKING FOOD PRODUCTS
Filed June 18, 1965 4 Sheets-Sheet 3

INVENTOR.
EBEN H. CARRUTHERS
BY

March 5, 1968  E. H. CARRUTHERS  3,371,689
APPARATUS FOR PACKING FOOD PRODUCTS
Filed June 18, 1965  4 Sheets-Sheet 4

INVENTOR.
EBEN H. CARRUTHERS
BY

United States Patent Office 3,371,689
Patented Mar. 5, 1968

3,371,689
APPARATUS FOR PACKING FOOD PRODUCTS
Eben H. Carruthers, Warrenton, Oreg. 97146
Filed June 18, 1965, Ser. No. 464,927
5 Claims. (Cl. 141—81)

My invention relates to a method and apparatus for packing food products.

While the invention is applicable to the packing of various food products, such as various meat products, some vegetables such as string beans, the method and machine have been more particularly developed for the packing of tuna fish in so-called "chunk" or "flake" packs. Reference is made to my Patent No. 2,602,578 issued July 8, 1952 which shows a machine of the general type disclosed herein and upon which the method and machine of this application is an improvement. Reference is also made to my application Ser. No. 293,787 entitled "Machine for Packing Food Products," filed July 9, 1963, now abandoned, on which machine the subject matter of this invention is also an improvement.

In my above mentioned patent and application, I have described a machine for packing products, particularly tuna fish, in which the tuna in flake or chunk condition is fed to the machine. The tuna is fed into pockets or pressure cylinders which are continuously moved through a path of travel. Force or pressure is applied on the product subsequent to a filling operation to fill voids, expel air and insure a substantially uniform homogenous fill of tuna in the pockets. After pressure has been applied, the resulting cake of tuna is trimmed off to bring the amount of tuna in the chamber to substantially the desired predetermined weight to be placed in the container to be filled. Thereafter, the compressed cake of tuna is transferred to a can or other container and then subjected to the usual later canning processes common in tuna canneries.

The machine of the above patent has been in successful operation in most of the canneries of this country and has become the standard machine for packing tuna in so-called "chunk" style. More recently most of the canneries have adopted the machine of the above mentioned application. One of the problems encountered with the machine of the above mentioned patent and the machine of the above mentioned application is the dropping of crumbs of tuna from the cake after the cake of tuna has been formed in the measuring chamber. These crumbs of tuna drop on the floor, or drop on the lower parts of the machine including the base and cause an extremely unsightly appearance. At the end of a day's run a considerable amount of time is required to clean the floor and the lower parts of the machine. Moreover, there is a wastage of tuna which is an expensive fish, and over the course of a year, this wastage can amount to a considerable amount of money.

Another problem with the machines of the above mentioned patent and application is that liquid squeezed from the tuna as it is formed into a cake leaks downward between the plungers and adjacent cylindrical walls and gains access to the plunger cam followers and related mechanisms. The tuna liquor tends to gum up these parts and makes it necessary to partially disassemble the machine and clean these parts thoroughly at relatively frequent intervals. Moreover, the steam with which the machine is cleaned at the end of each day's run tends to cause some corrosion in these parts which makes for abnormal replacement of parts and adds to the cleaning problem.

The objects of this invention are to provide a machine in which provision is made to substantially eliminate the above two problems.

Other objects and advantages of my invention will be particularly set forth in the claims and will be apparent from the following description, when taken in connection with the accompanying drawings, in which:

Figure 3:
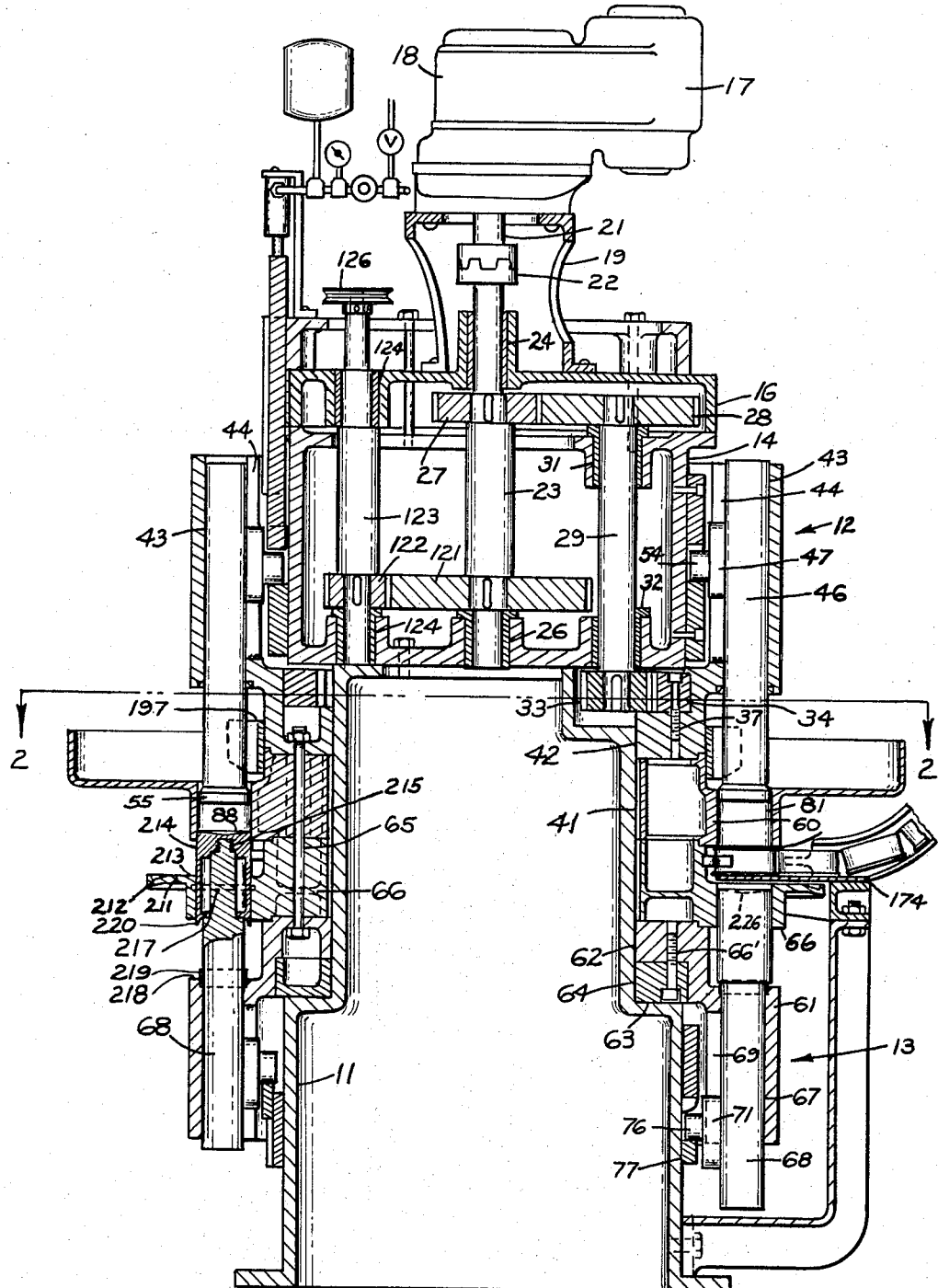
FIG. 3 is a vertical sectional view of the machine taken substantially on the line 3—3 of FIG. 2 in the direction indicated by the arrows.

Referring to FIG. 3, the mechanism of the method and machine of my invention is carried by a stationary main frame casting 11 which may be suitably secured to the floor by means not shown. Carried by the main frame is an upper rotatable turret, generally indicated by the numeral 12 and a lower rotatable turret generally indicated by the numeral 13.

Carried by the main frame at the top thereof and rigidly secured thereto, but removable therefrom, is a casting 14. The casting 14 together with a removable casting 16 constitutes a gear casing and houses and supports the drive gears for various parts of the machine as will be presently explained.

The machine is driven by a motor 17 through a suitable speed reducer 18. 17 and 18 constitute a variable speed drive for the machine to enable the machine operator by suitable controls to vary the speed of all operations at will in a manner well known in the art to which the invention applies, and more particularly to control the filled can output of the machine.

The variable speed drive 17–18 is mounted on the top of the casting 16 by means of an adapter 19 bolted thereto. The output shaft of the variable speed drive 17–18 is indicated by a shaft 21 driving a main shaft 23 through a flexible coupling 22.

The main shaft 23 is mounted in suitable bearings 24 and 26 carried respectively by the castings 16 and 14. A spur gear 27 is keyed to the main shaft 23 and drives a gear 28 mounted on and keyed to a lay shaft 29. The lay shaft is carried in suitable bearings 31 and 32 supported in the casting 14 and has a drive pinion 33 at its lower end keyed thereto. The drive pinion 33 mates with and drives an internal ring gear 34 which drives the upper and lower turrets in a manner which will be presently clear.

The upper turret 12 comprises a single casting which rotates about the frame structure above described as an axis. For the purpose of securing the casting of the upper turret 12 to the internal ring gear 34, a series of screws 37 extend annularly around and between the parts so that the upper turret 12 is a rigid rotating unit rotating with the internal ring gear 34. The main frame 11 has an accurately machined cylindrical face or barrel 41 upon which the internal machined face 42 of the upper turret 12 rides.

The upper turret 12 has a plurality of vertically extending bores 43 each of which merges with a vertically extending guide slot or way 44. Each of the ways or guide slots 44 lies on a radius of the circle about the center of which the upper turret 12 rotates.

In the drawings I have shown twenty-four (FIG. 2) vertically extending bores 43 for the reception of a corresponding number of pistons or plungers 46 (FIG. 3). It will be appreciated that the number of plungers employed and the number of their associated parts is optional depending upon the design of the machine, the speed thereof, and the number of operations to be performed as each plunger completes a cycle.

Each of the plungers 46 carries a guide block 47, as shown in application Ser. 293,787 in more detail which rides in the guide slot 44 and carries a roller 54. The roller rides in a cam groove formed between two cam systems as will presently be described.

The lower turret 13 (FIG. 3) comprises an annular casting 61 which is driven from the upper turret. For this purpose a box-like casting 60 lies between the upper and lower turret castings and the turrets are tied together so that they rotate in unison by an annular series of through bolts 65. Interposed between the upper and lower turrets 12 and 13 and tied to rotate with them by the bolts 65 is a secondary basin casting 66 which will be later particularly described. The casting 60 has an annular series of pockets or chambers 81 corresponding in number to the number of upper and lower plungers. The casting 61 has a machined face 62 which rides on the machined surface 41 of the barrel shaped portion of the main frame 11. The main frame also has an annular machined ledge 63 adapted to receive and support a rotatable bearing ring 64. The bearing ring 64 is secured to the casting 61 of the lower turret 13 by means of a series of screws 66' spaced annularly round and between the parts.

Figure 1:
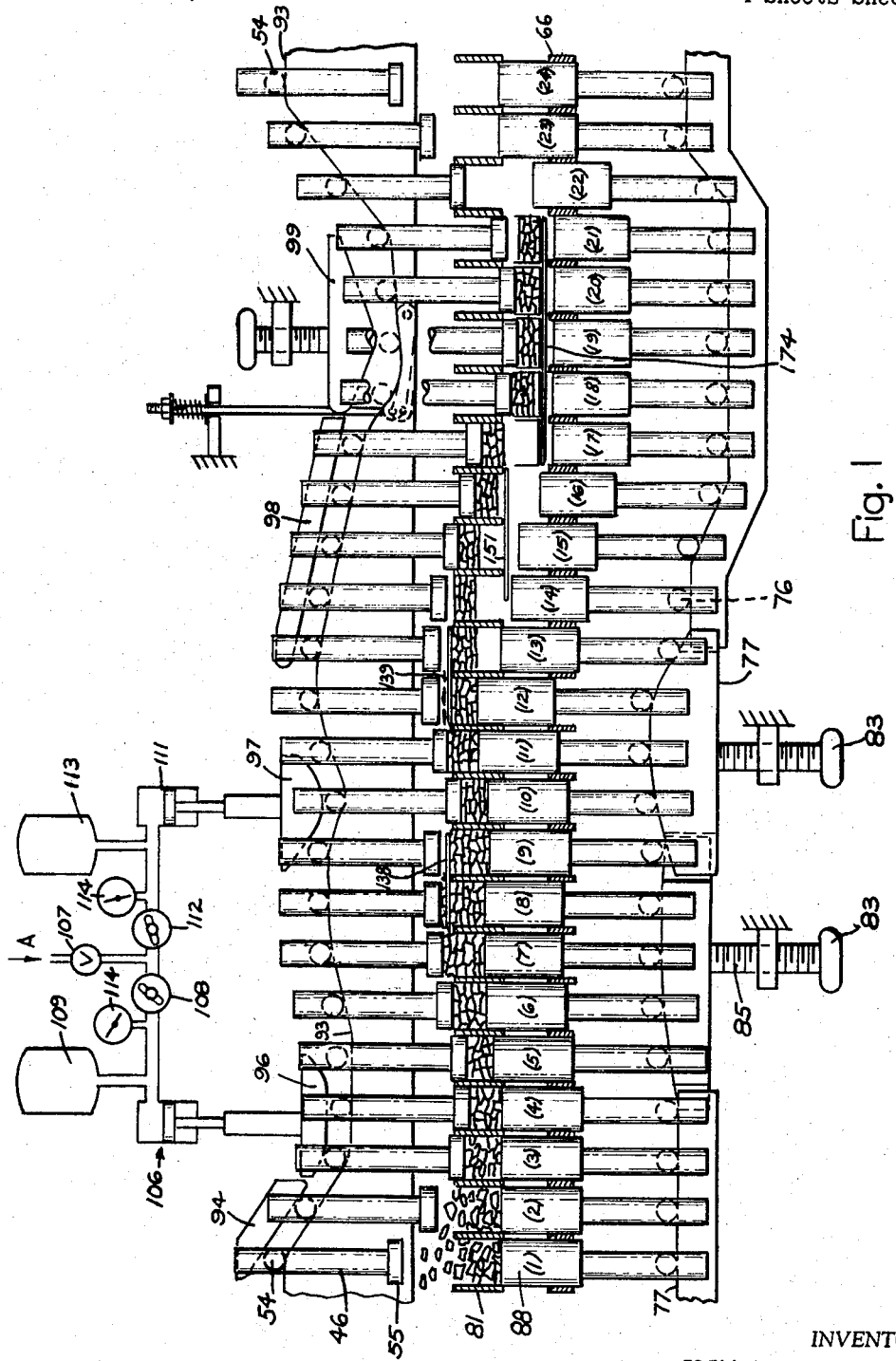
FIG. 1 is a diagrammatic view showing a developed layout of the machine and showing the complete functional operation as the tuna chunks or flakes progress through the machine and are deposited in the container and illustrating the method of my invention.

The lower turret 13 has a series of bores 67 corresponding to the number of bores in the upper turret 12. These bores are adapted to receive plungers 68. The casting 13 is provided with plunger guides 69 for the reception of blocks 71 secured to the plungers. A roller 76 rides on a cam system, or rather a series of partial cams 77 as illustrated in FIG. 1. It will now be appreciated that as the rollers 76 ride on the partial cam system, the plungers move into and out of the pressure chambers 81 formed in the casting 60.

As shown most clearly in FIG. 1, the central two cams of the partial cams are adjustable in height. This height adjustment includes a rotatable handpiece 83. The partial cam is slotted to receive screws 85 which allow a raising and lowering of the partial cam 77. As shown in FIG. 1, each of the two central partial cams 77 is adjustable in height while the remainder of the partial cams are fixed.

As shown most clearly in FIG. 1, the upper rollers 54 ride on a lower cam 93, the shape of which will be apparent from FIG. 1. The upper cams for the rollers 54 are indicated by the numerals 94, 96, 97, 98 and 99. As will be apparent from FIG. 1, the first upper cam 94 is merely a hold-down cam, and at the first two stations 1 and 2, as viewed in FIG. 1, the uper plungers 46 are in a raised position held out of the compression chambers 81 by the contour of the lower cam. This is the tuna chamber filling position of the machine. The tuna is deposited by means of a conveyor 101 (FIG. 2), on a basin 102 part of the casting 60 which carries the filling chambers 81. The tuna is guided into the chambers by a baffle 103, the lower edge of which lies closely above the bottom of the basin. The basin has an upstanding peripheral wall 104 (FIG. 3), the basin carrying excess tuna trimmed from the compression chambers as will presently appear, around the axis of the machine to the filling position.

The second cam 96 (FIG. 1) is actuated by a piston and cylinder assembly generally indicated by the numeral 106. Air is supplied to the piston and cylinder assembly 106 from a source of supply, as indicated by the arrow A, which passes through a valve 107 and a pressure regulator 108. An air chamber 109 of relatively large volume is in the line to provide an air spring for the piston of the piston and cylinder assembly 106. The use of an air spring provides a pressure on the piston which is constantly increasing as it meets resistance until the pressure for which the system is set is reached. At this pressure which may be varied by the valve 107, the resistance to further compaction equals substantially the set pressure and the degree of compaction is a constant for all cylinders. The weight of tuna compacted in all cylinders is then substantially a constant. The air spring provides the equivalent of a conventional spring very long in length so that the relatively short movement of the plunger 46 upward to compress the air changes the pressure on the plunger a very small amount to the end that for all practical purposes constant pressure is provided. The cam 97 is actuated by a similar piston and cylinder assembly 111 from the same source of supply, as indicated by the arrow A, and passes through a regulator 112, another air pressure accumulator 113 constituting an air spring being in the line. 114 merely indicates pressure gauges.

It will be observed, upon examination of FIG. 1, that the air actuated piston and cylinder assembly 106 is moving downward at the third and fourth stations to compress the tuna between the upper plunger heads 55 and the lower plunger heads 88. By adjusting the air pressure on the piston and cylinder assembly 106, the cam and hence the upper plunger heads may be moved downward with any desired force. Preferably this force is as small as possible but sufficient to secure the desired compression of the product.

It will be understood that the original loose volumetric fill of tuna in each of the pockets or pressure chambers is made as uniform as possible. The means for accomplishing this is more fully described later. The weight of the material in the fill of the pressure chambers must always be somewhat above the final desired weight to be placed in the cans. The original loose fill is then compacted by the first adjustable air spring, above described, to give it as nearly a uniform density as possible considering the unavoidable weight variations of the loose fill. The air spring loading of the cam 96 is then relieved to allow the compacted mass to expand as indicated at stations 5, 6, and 7.

It will be particularly noted that the second cam 77 rises throughout stations 5, 6 and 7 to push the charge of tuna in the measuring chambers upward so that part of the charge lies above the mouth of the measuring chamber. The cam segment 77 at stations 5, 6, and 7 is also adjustable by screw 85.

Figure 2:
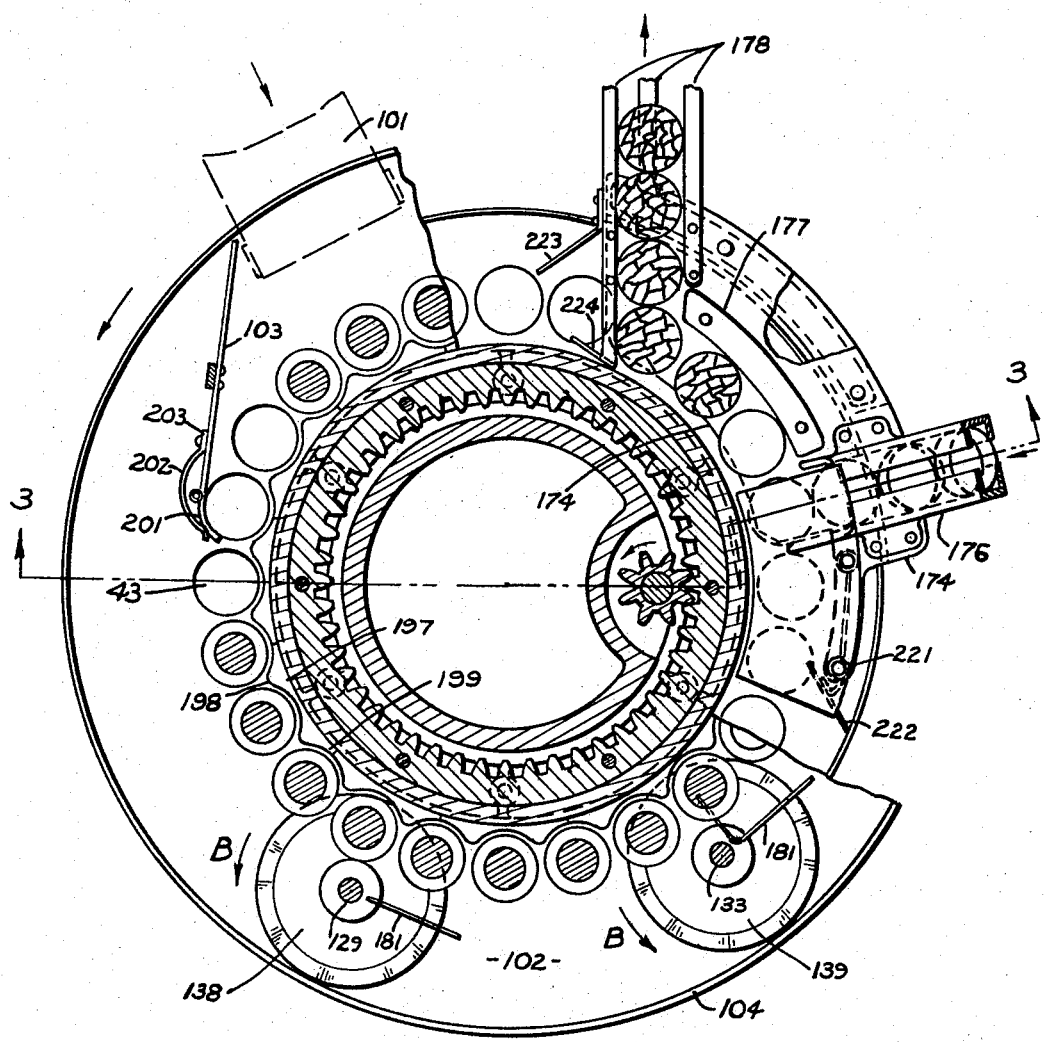
FIG. 2 is a sectional view taken substantially on the line 2—2 of FIG. 3 in the direction indicated by the arrows.

The pulley 126 through the mechanisms shown and described in the above mentioned application drives two shafts 129 and 133 (FIG. 2).

Rigidly secured to the shafts 129 and 133 at the lower ends thereof are knives 138 and 139. The knives are circular, rotated horizontal to the plane of the basin and rotated directly above and in close proximity to the compression chambers 81. In fact, they form substantially a running fit with the mouths of the compression chambers as the chambers pass successively under them.

The third cam segment 77 is also adjustable by a screw 85. The original fill made at stations 1 and 2 can, of course, vary considerably but the least fill must be in excess of the net end fill. This is accomplished by setting the screw 85 at the left of FIG. 1 so that the volumetric capacity of the measuring chambers allows an excess of material into the measuring chambers. This excess is cut off at either trimming stations 8 and 9 or trimming stations 12 and 13. With due allowance for expansion of the material when the pressure on the upper plungers is relieved, the ideal setting of the screws 85 is such as to trim some material at stations 8 and 9 and trim only a slight amount of material off the tops of the measuring chambers at stations 12 and 13. The adjustment of the screws 85 is subject to variables such as the moisture content of the fish. In some cases no trim at all may occur at either the first trim or the second but some trim will always occur at either the first trim station or the second trim station; otherwise there will be some cans of tuna under filled.

The charge of tuna has now been compressed into a uniform mass of substantially constant weight per unit of volume. In this condition and due to the oily nature of the fish, it will support itself due to friction and cohesion of the cake with the walls of the compression chamber. This may be clearly observed at station 14. It will be noted that at station 14 (and 13), the lower plunger has been withdrawn and passes under what may be termed a shear plate 151. The purpose of the shear plate is to catch any loose pieces of tuna which may drop from the compressed cake. The shear plate extends throughout most of stations 14, 15, and 16.

A can plate 174 is carried by brackets and is more fully described in the above mentioned copending application. The cans enter the machine through a can chute 176 (FIG. 2) which is conventional in this type of machine, are guided by an annular guard plate 177 and the filled cans are discharged through a discharge chute 178. The can plate 174 is stationary and constitutes a supporting surface for the cans or other containers during the interval when the cans are being supplied empty to the machine and while they are being filled and while they are being discharged from the machine as shown in FIG. 2.

At station 17, a can is brought in registry with a compression chamber and transfer to the cans occurs at stations 18, 19, and 20. At station 21, the filled cans are leaving the machine and the upper plungers or pistons are moving upward. The lower plungers start to move upward at station 22, and at stations 23 and 24 they close the bottom of the compression chambers and the upper plungers are withdrawn from the compression pockets to restart the cycle at stations 1 and 2.

As previously mentioned, the filling basin 102 always carries an excess of tuna to insure that the compression chambers at the filling stations 1 and 2 will be always over filled with tuna. The tuna, after being cut off, is directed by guards or baffles 181, supported in any suitable manner from the frame of the machine, toward the periphery of the rotating basin.

As shown in FIG. 2, pivoted on the end of the baffle or filling blade 103 is a cup-shaped member 201 which is spring pressed by a spring 202 secured to the baffle as shown at 203. This cup-shaped member 201, as the upper plunger is coming down, partially encircles the plunger to assist in holding the tuna in the compression chamber as the pressure chamber is being filled.

As shown in FIGS. 2 and 3, secured to the upper turret are elements 197, the outer edges 198 of which are scalloped to provide partial cylindrical segments 199 which lie directly over the filling chambers to assist in confining the fish as it is directed into the filling chambers. These partial cylindrical segments cooperate with the cup-shaped member 201 during the filling operation.

It will be understood from the foregoing that after the first compression, expansion and trimming, the tuna in the pockets is substantially uniformly compressed and is approximately the desired weight. The first compression, expansion and trimming of the tuna should leave only a thin slice of tuna to be trimmed off the tops of the chambers during the second compression, expansion and trimming steps. Considering the variations in the texture and moisture content of the fish, considerable cut and try of the adjustments on the machine are necessary. However, the most important factor in securing accurate filled-in weight of the cans is to make the adjustments so that the second trim knife has only a very thin slice of tuna to cut off the tops of the compression chambers. However, at least some trim on each of the chambers should preferably be made on the second trimming, otherwise there might be some cans under weight. I have found in practice, by proper adjustments, the machine will give extremely accurate weight control and the accomplishment of this objective has been one of the major problems confronting the tuna industry. I have experimented with the use of only a single trim knife and while there is less cutting up of the tuna into small particles, the weight control is not as accurate. It becomes then a question of whether the canner wishes to avoid cutting up the tuna so much at some sacrifice of weight control. In actual practice the method of adjusting the machine for a certain can weight of fish is done from back to front. The first adjustment to control the weight would be made at the second trim knife 139 by the second adjustable partial cam 77. After that has been made if the operator finds there is too much trim being made at this point, then the cam under the first trim knife 138 is adjusted so more trim is taken at this point. On the other hand, if the second trim knife 139 is not trimming any at all then the first trim knife partial cam 77 has to be lowered so a greater quantity of fish is delivered to the second trim knife 139. After this adjustment is made it may be apparent that too much fish is being trimmed by the first trim knife. If this is so the remedy is to cut down the original in-put at the pocket or measuring chamber 81. On the other hand if the first trim knife 138 is trimming too little or, in fact, not trimming any on some pockets, then it is obvious that the original loose fill has to be increased some.

A further problem in the tuna industry is to secure the proper amount of head space in the can to suit the desires of the particular canner and more particularly, to enable adjustment of the machine to compensate for variations in the texture and moisture content of the fish. Moreover, oil is usually added to the tuna after it is packed. If the tuna is soft, less head space is desirable. The oil can then soak down through the fish and does not lie above the cake of tuna to any material extent. In general, a firm fish requires more head space because the oil has a tendency to remain on top of the cake of tuna. The head space desired is most frequently determined by the particular canner, some desire considerable head space while others desire less.

The method and means by which the head space in the can may be controlled is diagrammatically illustrated in FIG. 1 above stations 18, 19 and 20 and is fully described in the above mentioned application.

Referring again to FIG. 1, it will be noted from an examination of the position of the cake of tuna at stations 13 to 17 inclusive that the cake of tuna is unsupported. The nature of tuna (and some other foods) is such that it will adhere to the sidewalls of the measuring chambers. This is due to the oily character of the fish and the fact that the cake has been compressed. However, bits or crumbs of tuna may fall off the cake particularly adjacent the lower center of the cake. This does not occur with each cake, but occurs frequently enough that crumbs of tuna at the end of a day's run are scattered on the floor adjacent the machine and to some extent pile up on the machine base casting and associated parts. This is not only unsightly but also causes expense in cleaning the machine at the end of the day. Moreover, tuna is an expensive fish and over a period of a year the wastage of tuna may represent a substantial amount of money.

As shown, the lower turret 13 (see FIG. 3) carries the secondary basin casting 66 which is tied to the lower turret by the annular series of through bolts 65. The secondary basin casting has a secondary basin 211 integral therewith. Spaced inward from the periphery of the basin 211 is an annular depressed trough 212 adapted to hold moisture and small particles of tuna collected inadvertently during the operation of the machine. The secondary basin 211 has a series of pockets or cylindrical openings 213 through which the lower plungers 68 reciprocate. The lower plungers are in two parts, one of which is a head 214 threaded in the main part of the plunger 68 as shown at 215.

From the previous description, it will be understood that the secondary basin is annular and rotating with the turrets and measuring chambers. Since it is below the cans (right of FIG. 3), it is in a position to catch all these crumbs or bits of tuna. Substantially all the crumbs fall on the auxiliary basin and can be recovered. The manner of recovery and re-use of these crumbs or bits of tuna and the secondary basin are unique.

Figure 4:
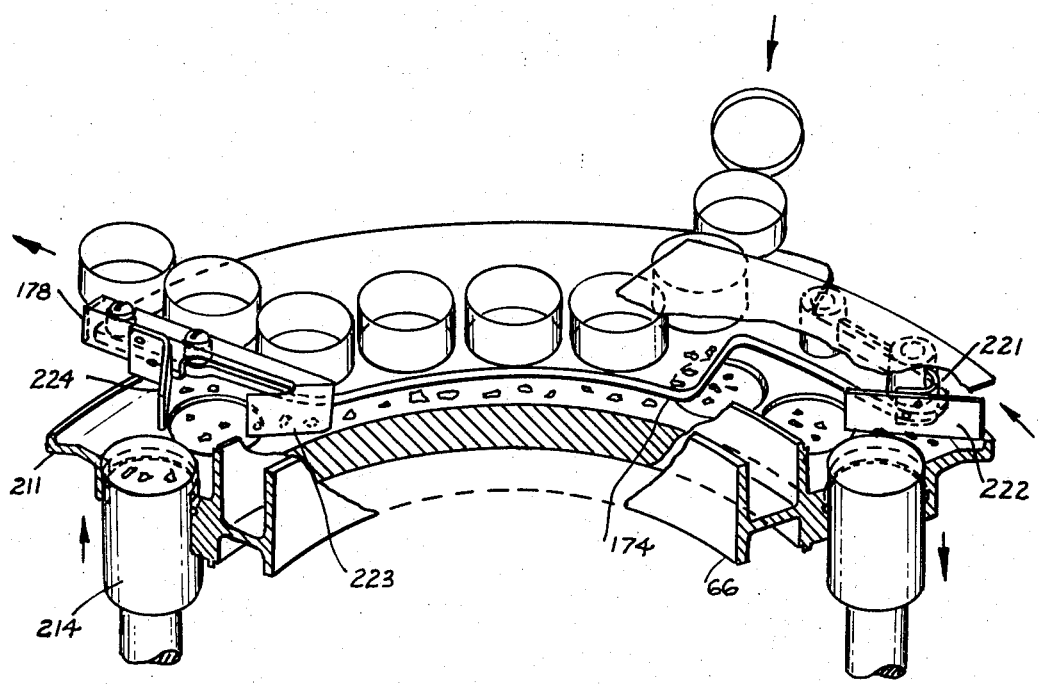
FIG. 4 is a perspective looking from the interior of the machine and showing particularly the lower basin and its baffle.

Carried by a fixed part of the machine, as shown at 221 (FIGS. 2 and 4) is a scraper or guide blade 222, the lower edge of which extends in close proximity to the surface of the secondary basin. Carried by the can discharge conveyor are two scraper or guide blades 223 and 224. As shown in FIG. 3 (at the right) when in their lowermost position, the lower plungers are below the substantially planar surface of the secondary basin 211. In addition the heads of the plungers may be slightly dished as shown by the dotted lines 226. The guide blades 222, 223 and 224 are angled, as will be apparent from FIGS. 2 and 4, so as to sweep the crumbs or bits of tuna which fall on the secondary basin toward and into the pockets formed by the recessed plunger heads. The baffle 222 sweeps the crumbs toward the recess formed by the lower plungers being below the surface of the lower basin and some of the crumbs at this point may go into the pocket. However, if there is an excess of crumbs, some of them will pile up at the forward end of the can plate 174, but at this point as the cans enter they will sweep this excess across the can plate and into the space between the inner edge of the can plate and the vertical wall of the lower basin. Some of these crumbs, of course, will pass under the can plate 174 which is set quite close above the lower basin. The crumbs that pass under the can plate and any that may fall out of the can after the fill, are swept into the pocket by baffles 223. Those crumbs that were pushed by the can toward the vertical wall of the basin are swept into the pocket of the lower plunger by baffle 224. If there is a slight amount of liquid along with the crumbs it also will be swept into the pocket by baffles 223 and 224. The purpose of the recess in the lower plunger head is to provide somewhat of a pocket for the liquid, especially so that it will be retained along with the crumbs on the top of the heads as it is being raised to the fill position.

The purpose of the gutter or trough 212 is to catch liquid in excess of that which could normally be handled in the manner just described, that is by being retained on the heads of the plunger and raised with the crumbs to be absorbed by the material of the new fill. As a practical matter so far it is not necessary to use the gutter 212 to drain off excess.

Another problem in connection with the machine of the above mentioned patent and the machine of the above mentioned application is that moisture squeezed from the product and the condensed steam by which the machine is cleaned at the end of a day's run gains access to the lower plungers, the bores in which they ride, and the plunger guides 69. These tuna juices are inclined to be sticky and, of course, the condensed steam is corrosive. The combination tends to foul up the above mentioned parts requiring some dismantling of the machine to clean the parts, replace when necessary, and remove corrosion and the gummy tuna liquid.

For the purposes of substantially eliminating the above problems, the secondary basin serves to catch the liquid squeezed from the product which flows into the gutter 212 from whence it can be periodically drawn off. This moisture has substantial food value and can be returned to the product. Additionally, to protect the above mentioned parts, the wall of the basin is provided with an O-ring 217 which prevents moisture from passing downward between the plunger and the adjacent cylindrical walls.

As further protection of the above mentioned parts, surface 218 may be provided by a dam ring 219 and the plunger may be provided with a skirt 220 which encircles the dam ring when the plunger is in its lowermost position. As shown at the right of FIG. 3, this construction further aids in preventing moisture and tuna juices from flowing downward between the plunger and the adjacent cylindrical walls.

While I have shown the preferred form of mechanism of my invention and method of using the same, it will be apparent that various modifications and changes may be made therein, particularly in the form and relation of parts without departing from the spirit of my invention as set forth in the appended claims.

I claim:
1. A machine for packing a food product in containers wherein a basin having measuring chambers is driven through a path of travel; product deposited on the basin is urged into the measuring chambers as the measuring chambers move through their path of travel; and containers are moved through a path of travel which includes a container filling position beneath and in alignment with said measuring chambers comprising, in combination:
   (a) means including lower plungers for supporting and compressing the product into cakes;
   (b) means for withdrawing the plungers from the measuring chambers and transferring the cakes of product from the measuring chambers to the containers in succession;
   (c) means below said containers for catching any crumbs of product which may break off from a cake prior to transfer; and
   (d) means for adding the crumbs from one cake to a succeeding cake of product.

2. A machine in accordance with claim 1 wherein the means for catching the crumbs is a secondary basin having lower plunger openings through which the lower plungers extend; said plungers when in their lowermost position being below the level of the secondary basin to provide pockets into which the crumbs are swept.

3. A machine in accordance with claim 1 in which the lower plungers ride in cylindrical plunger guides, sealing means are provided in the walls defining the plunger openings in the lower basin to prevent liquids squeezed from the product from flowing downward along said walls and the plungers and gaining access to said plunger guides.

4. A machine in accordance with claim 2 in which the secondary basin has a gutter into which liquid squeezed from the product may flow.

5. A machine in accordance with claim 2 in which a casting has lower guides for said plungers, the upper surface of said casting carries dam rings and the plungers carry heads the lower part of which have skirts which in the lowermost position of the plungers encircle the dam rings.

References Cited

UNITED STATES PATENTS 2,701,674   2/1955   Christiansen ——————— 141—81

LAVERNE D. GEIGER, *Primary Examiner.*

H. BELL, *Assistant Examiner.*